United States Patent [19]

Yahagi et al.

[11] Patent Number: 5,005,917

[45] Date of Patent: Apr. 9, 1991

[54] ANTI-LOCK BRAKE CONTROL METHOD

[75] Inventors: Toshio Yahagi; Yoshihiro Iwagawa; Yoichi Sugimoto; Tsuyoshi Satoh, all of Saitama, Japan

[73] Assignee: Honda Giken Kogyo Kabushiki Kaisha, Tokyo, Japan

[21] Appl. No.: 380,415

[22] Filed: Jul. 17, 1989

[30] Foreign Application Priority Data

Jun. 6, 1989 [JP] Japan .................. 1-143277

[51] Int. Cl.$^5$ ................................. B60I 8/78
[52] U.S. Cl. .................... 303/113; 303/100; 303/119
[58] Field of Search ............... 303/113, 116, 119, 115, 303/92, 95, 91, 100

[56] References Cited

U.S. PATENT DOCUMENTS

| | | | |
|---|---|---|---|
| 4,129,342 | 12/1978 | Sato et al. | 303/119 X |
| 4,202,584 | 5/1980 | Sato et al. | 303/119 X |
| 4,215,902 | 8/1980 | Sato et al. | 303/113 X |
| 4,296,972 | 10/1981 | Sato et al. | 303/113 |
| 4,557,528 | 12/1985 | Leiber | 303/119 X |
| 4,611,859 | 9/1986 | Otsuki et al. | 303/119 X |
| 4,653,815 | 3/1987 | Agarwal et al. | 303/113 X |
| 4,708,404 | 11/1987 | Seibert et al. | 303/119 X |
| 4,714,299 | 12/1987 | Takata et al. | 303/114 X |

FOREIGN PATENT DOCUMENTS

| | | |
|---|---|---|
| 0256665 | 2/1988 | European Pat. Off. . |
| 2901673 | 7/1979 | Fed. Rep. of Germany ...... 303/119 |
| 1027088 | 4/1966 | United Kingdom . |
| 2162264 | 1/1986 | United Kingdom . |

Primary Examiner—Matthew C. Graham
Attorney, Agent, or Firm—Armstrong, Nikaido, Marmelstein, Kubovcik & Murray

[57] ABSTRACT

In a method of anti-lock brake control, in which when the wheel is about to become locked, a control valve is capable of controlling a braking pressure for a brake device irrespective of a braking operation. The control valve is operated to reduce the braking pressure of the brake device in order to reduce a braking force, thereby preventing the wheel from becoming locked. When the braking pressure is to be recovered, the control valve is operated to intermittently increase the braking pressure of the brake device for a given time in order to moderate the increasing of the braking force. The control of the intermittent increasing of the braking pressure is stopped when the completion of the braking operation has been detected in the course of intermittently increasing the braking pressure in recovering the braking pressure. This avoids the wasteful operation of the control valve to prevent the generation of any unwanted operational noise and a wasteful consumption of electric power.

6 Claims, 5 Drawing Sheets

ANTI-LOCK BRAKE CONTROL METHOD

BACKGROUND OF THE INVENTION

1. Field of the Invention

The field of the present invention is methods of anti-lock brake control, in which when the wheel is about to become locked, control valve means capable of controlling a braking pressure for a brake device irrespective of a braking operation is operated to reduce the braking pressure of the brake device in order to reduce a braking force, thereby avoiding the wheel becoming locked, and when the braking pressure is to be recovered, the control valve means is operated to intermittently increase the braking pressure for the brake device for a given time in order to moderate the increasing of the braking force.

2. Description of the Prior Art

There is a conventionally known an anti-lock brake control device in which the operation of control valve means for controlling the braking pressure for a brake device is controlled in accordance with a variation in speed of a subject wheel, and when the braking pressure is to be recovered, the control valve means is intermittently operated for a given time to slowly increase the braking pressure. However, when the vehicle operator or driver has his or her foot released from a brake pedal during an intermittent operation of such control valve means, during a time when it is unnecessary to cause the control valve means to continue its intermittent operation, otherwise an unnecessary operational noise may be generated, and electric power may be wastefully consumed.

SUMMARY OF THE INVENTION

Therefore, it is an object of the present invention to provide a method of anti-lock brake control, wherein upon completion of the braking operation when the control valve means is being intermittently operated to recover the braking pressure, a wasteful operation of the control valve means is avoided, thereby preventing the generation of any unwanted operational noise and providing a reduction in consumption of electric power.

To attain the above object, according to the present invention, the control of the intermittent increasing of the braking pressure is stopped when the completion of the braking operation has been detected in the course of intermittently increasing the braking pressure.

This makes it possible to stop the intermittent operation of the control valve means upon completion of the braking operation in the course of increasing the braking pressure, thereby avoiding the wasteful operation of the control valve means to prevent the generation of any unwanted opoeration noise and the wasteful consumption of electric power.

With the above method in which the intermittent braking pressure-increasing control is stopped upon completion of the braking operation, when a part for detecting the condition of the braking operation has failed, there is a fear that the intermittent braking pressure-increasing control by the control valve means may be impossible when the braking pressure is to be recovered. To avoid this, a circuit for diagnosing the trouble of the brake switch must be provided, resulting in a complicated structure.

Thereupon, it is another object of the present invention to enable the intermittent operation of the control valve means regardless of whether any malfunction exists in of the part for detecting the braking operation.

To accomplish this object, when the braking pressure is to be recovered after operation of the control valve means to reduce the braking pressure for the brake device, the control valve means is operated to intermittently increase the braking pressure irrespective of the detected condition of the braking operation.

The above and other objects, features and advantages of the invention will become apparent from a reading of the following description of the preferred embodiments, taken in conjunction with the accompanying drawings.

BRIEF DESCRIPTION OF THE DRAWINGS

FIGS. 1 to 6 illustrate one embodiment of the present invention, wherein

DESCRIPTION OF THE PREFERRED EMBODIMENTS

Figure 1:
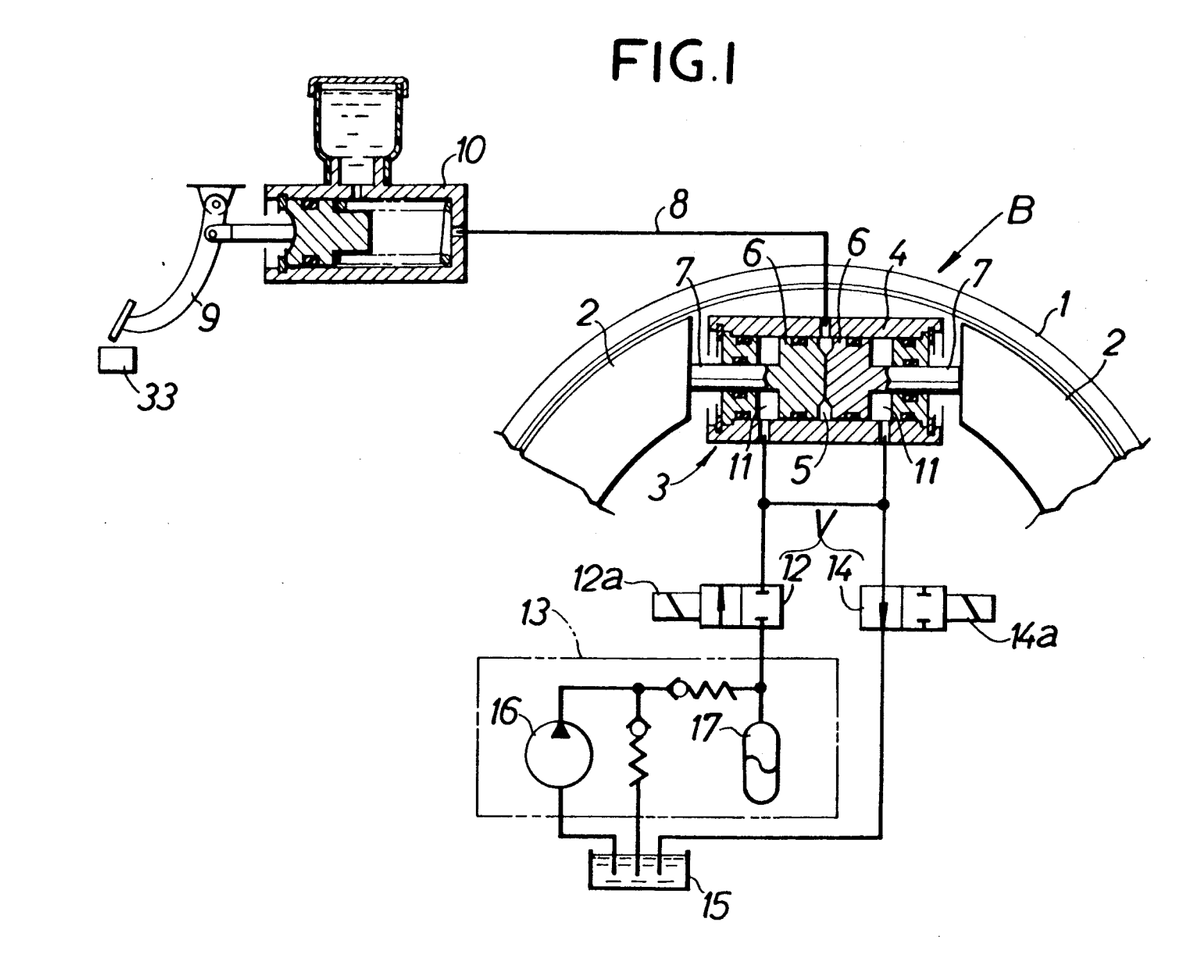
FIG. 1 is a diagram of a hydraulic braking pressure circuit.

The present invention will now be described by way of embodiments with reference to the accompanying drawings. Referring first to FIG. 1 illustrating one embodiment of the present invention, a disk brake device B, for example, of a drum type is mounted on a wheel which is not shown. The brake device B comprises a brake drum 1 integral with the wheel, a pair of brake shoes 2, 2 capable of coming into slide contact with an inner surface of the brake drum 1, and a wheel cylinder 3 connected to the brake shoes 2, 2. The wheel cylinder 3 comprises a pair of pistons 6, 6 slidably received in a cylindrical cylinder body 4 closed at its opposite ends. The pistons 6, 6 define a hydraulic braking pressure chamber 5 therebetween, and piston rods 7, 7 each coaxially connected to corresponding one of the pistons 6 are oil-tightly and movably passed through the corresponding closed ends of the cylinder body 4 and are connected to ends of the brake shoes 2, 2, respectively.

The hydraulic braking pressure chamber 5 is connected to an oil passage 8 which is connected to a master cylinder 10 that produces a hydraulic braking pressure in response to the operation of a brake pedal 9. Control oil pressure chambers 11, 11 are also defined between opposite end walls of the cylinder body 4 and the pistons 6, 6, respectively, and the oil pressure within each of the control oil pressure chambers 11, 11 is controlled by the operation of control valve means V.

The control valve means V is comprised of a first control valve 12 interposed between the control oil pressure chamber 11 and a control oil pressure source 13, and a second control valve 14 interposed between the control oil pressure chamber 11 and an oil tank 15. The control oil pressure source 13 includes a hydraulic pump 16 for pumping a working oil from the oil tank 15, and an accumulator 17 connected to the hydraulic pump 16, so that a normally constant control oil pressure can be supplied from the control oil pressure source 13.

The first control valve 12 is a normally-closed type solenoid valve and adapted to be opened when a solenoid 12a is excited. The second control valve 14 is a normally opened type solenoid valve and adapted to be closed when a solenoid 14a is excited. If the first control valve 12 is opened and the second control valve 14 is closed during braking, i.e., when a hydraulic braking pressure is being supplied into the hydraulic braking pressure chamber 5, the oil pressure within the control oil pressure chambers 11, 11 increases, thereby causing the pistons 6, 6 to move toward to each other irrespective of the hydraulic pressure within the hydraulic braking pressure chamber 5, resulting in a reduced braking force. This anti-lock brake control avoids the wheel becoming locked.

Figure 2:
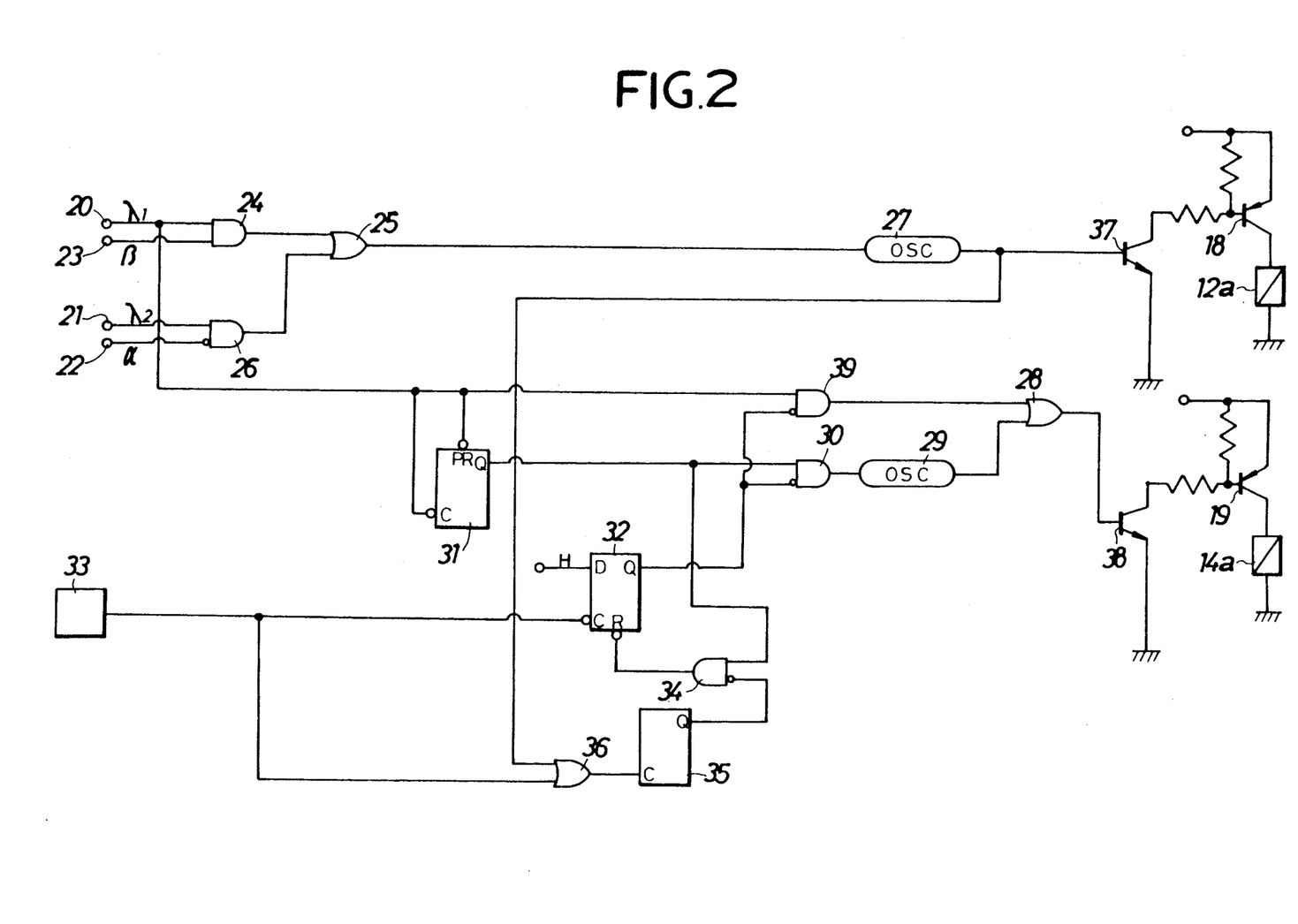
FIG. 2 is a diagram of a control circuit for controlling first and second control valves.

FIG. 2 illustrates a control circuit for controlling the energization of the solenoids 12a and 14a of the first and second control valves 12 and 14 which constitute the control valve means V in cooperation. In FIG. 2, the solenoid 12a is connected in series to a PNP transistor 18, and the solenoid 14a is connected in series to a PNP transistor 19. Thus, the solenoids 12a and 14a are excited as a low level signal is supplied to bases of the transistors 18 and 19, thereby allowing them to conduct.

A signal required for the anti-lock brake control is inputted to each of input terminals 20 to 23. More specifically, a signal $\lambda_1$, which becomes a high level when the slip rate of the wheel has exceeded a certain reference value on the basis of a wheel speed, is inputted to the input terminal 20, and a signal $\lambda_2$, which becomes a high level when the slip rate of the wheel has exceeded a reference value set larger than the above reference value on the basis of the wheel speed, is inputted to the input terminal 21. A signal $\alpha$, which becomes a high level when the wheel acceleration has exceeded a certain value, is inputted to the input terminal 22, and a signal $\beta$, which becomes a high level when the wheel deceleration has exceeded a certain value, is supplied to the input terminal 23.

The signals received in the input terminals 20 and 23 are supplied to an AND circuit 24 which delivers a singal to one of input terminals in an OR circuit 25. The signal received in the input terminal 21 is inputted to one of input terminals in an AND circuit 26, and the signal received in the input terminal 22 is inputted in a reversed manner to the other input terminal in the AND circuit 26. An output signal from the AND circuit 26 is supplied to the other input terminal of the OR circuit 25. Thus, the OR circuit 25 produces a high level signal either when there is a possibility for the wheel to become locked in a speed reducing condition, or when the possibility of the wheel becoming locked is increased when not in a speed-increasing condition.

A output terminal of the OR circuit 25 is connected to an oscillator circuit 27. An NPN transistor 37 is connected in series to the base of the transistor 18, and the oscillator circuit 27 is connected to a base of the transistor 37. Thus, a signal intermittently becoming a high level is outputted from the oscillator circuit 27 in response to the output from the OR circuit 25 becoming a high level, thereby permitting the solenoid 12a to be intermittently excited.

On the other hand, an output signal from the input terminal 20 is supplied to one of the input terminals of an AND circuit 39 in addition to the AND circuit 24, and an output signal from a flip-flop 32 is supplied in an inverted manner to the other input terminal of the AND circuit 39. An output signal from the AND circuit 39 is applied to one of input terminals of an OR circuit 28. Moreover, an NPN transistor 38 is connected in series to the base of the transistor 19, and the OR circuit 28 is connected to a base of the NPN transistor 38.

An oscillator circuit 29 is connected to the other input terminal of the OR circuit 28 and produces a signal which intermittently becomes a high level in response to an output from an AND circuit 30 becoming a high level. In addition, an output signal from a monostable circuit 31 is supplied to one of the input terminals of the AND circuit 30, and an output signal from the flip-flop 32 is invertedly inputted to the other input terminal of the AND circuits 30 and 39.

In response to a signal from the input terminal 20 becoming a low level, the monostable circuit 31 produces a high level signal which is sustained for a given time, e.g., for one second, from a falling of the signal from the input terminal 20. The flip-flop 32 is a so-called D flip-flop and produces a signal received in a D input terminal when a signal received in a C input terminal has become a high level, wherein a normally high level signal is inputted to the D input terminal, while an output from a brake switch 33 is invertedly inputted to the C input terminal. The brake switch 33 detects a braking operation provided by depression of the brake pedal 9 and produces a high level signal in response to the braking operation.

Thus, when the signal inputted to the input terminal 20 during braking becomes a high level, i.e., when the slip rate of the wheel exceeds a certain reference value, the output signal from the AND circuit 39 is at a high level, whereas the output signal from the AND circuit 30 becomes a low level. As a result, the output signal from the OR circuit 28 becomes a high level to excite the solenoid 14a. On the other hand, when the signal inputted to the input terminal 20 during braking becomes a low level, i.e., when the slip rate of the wheel is less than the certain reference value, the output signal from the AND circuit 30 is at a high level for a given time, whereas the output signal from the AND circuit 39 becomes a low level, thereby permitting the solenoid 14a to be intermittently excited for a given time by an intermittent high level signal from the oscillator circuit 29.

An output from an AND circuit 34 is invertedly inputted to a reset terminal R of the flip-flop 32. An output signal from the monostable circuit 31 is inputted to one of input terminals of the AND circuit 34, and an output signal from a monostable circuit 35 is invertedly inputted to the other input terminal of the AND circuit 34. On the other hand, output terminals of the oscillator circuit 27 and the brake switch 33 are connected to input terminals of an OR circuit 36 whose output terminal is connected to an input terminal of the monostable circuit 35. Thus, at least either when the output from the oscillator circuit 27 has become the high level to excite the solenoid 12a or when the output from the brake switch 33 has become the high level, the monostable circuit 35 produces a signal which is at a high level for a given time.

Figure 3:
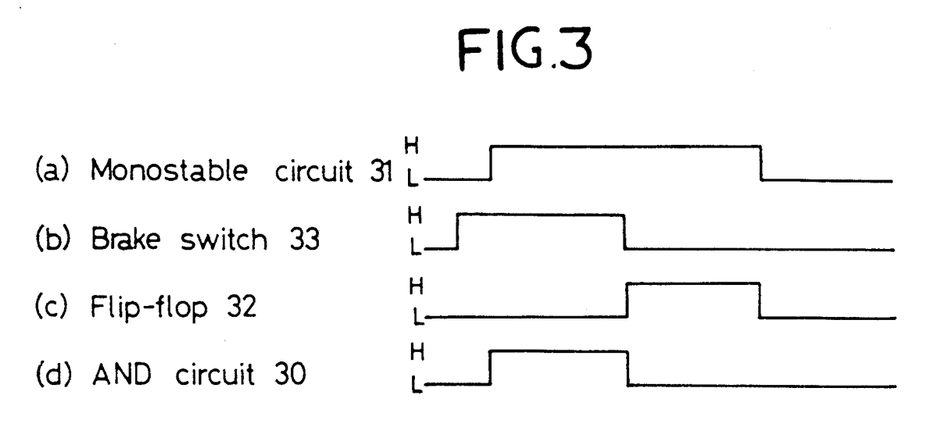
FIGS. 3, 4, 5 and 6 are timing charts illustrating timings of operation of main components, respectively.

The operation of this embodiment will be described below. First, a timing chart during a normal anti-lock brake control is as shown in FIG. 3. More specifically, as the output from the brake switch 33 becomes as shown in FIG. 3(b) when the output from the monostable circuit 31 is as shown in FIG. 3(a), the output from the flip-flop 32 becomes a high level in response to the output from the brake switch 33 becoming a low level, as shown in FIG. 3(c). Therefore, the output from the AND circuit 30 becomes a low level, as shown in FIG.

3(d), in response to the output from the brake switch 33 becoming the low level. In other words, when the signal inputted to the input terminal 20 is at the low level, i.e., when the possibility for the wheel to be locked has been eliminated, the output from the monostable circuit 31 becomes a high level for a given time and hence, the output from the AND circuit 30 is also at a high level, so that the signal from the oscillator circuit 29 permits the solenoid 14a to be intermittently excited. This causes the second control valve 14 to be intermittently operated, so that the oil pressure within the control oil pressure chambers 11, 11 is gradually reduced, leading to the braking force being slowly increased. When the vehicle operator or driver has his or her foot released from the brake pedal 9 at the middle of the intermittent operation of the second control valve, the output from the flip-flop 32 becomes a high level in response to the signal from the brake switch 33 becoming a high level. Therefore, the output signal from the AND circuit 30 becomes a low level, and the output from the oscillator circuit 29 becomes a low level. This causes the solenoid 14a to be deenergized, whereby the second control valve 14 is brought into an inoperative condition.

When the foot has been released from the brake pedal 9 in a condition where the output signal from the OR circuit 25 is at the high level and the output signal from the AND circuit 39 is at the high level, i.e., in a braking pressure reduced condition, as well as in a condition where the output signal from the OR circuit 25 is at the low level and the output signal from the AND circuit 39 is at the high level, i.e., in a braking pressure maintained condition, the signal from the flip-flop 32 becomes the high level, causing the solenoid 14a to be deenergized, whereby the second control valve 14 becomes inoperative.

Figure 4:
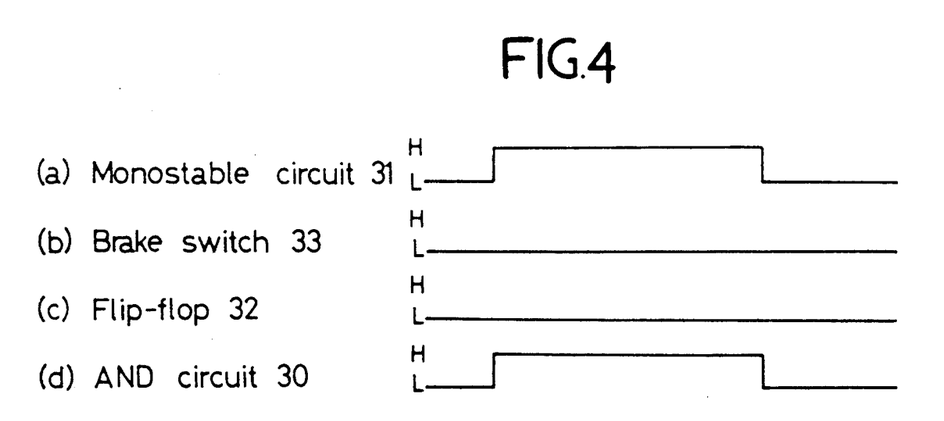

FIG. 4 illustrates a timing chart provided during an anti-lock brake control when the brake switch 33 has failed in an interrupted state. As the output from the brake switch 33 becomes a normally low level, the output from the flip-flop 32 sustains a low level, and the outputs from the AND circuits 30 and 39 depend upon the output signal from the monostable circuit 31 and the signal inputted to the input terminal 20. Accordingly, it is impossible to stop the operation of the second control valve 14 by stoppting the braking operation, but the malfunction of the brake switch 33 cannot adversely affect the anti-lock brake control itself.

Figure 5:
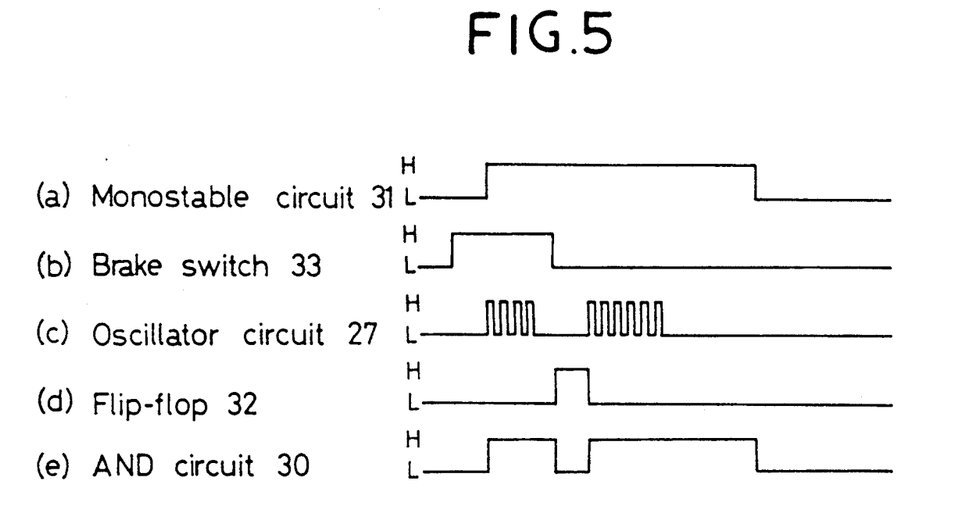

FIG. 5 illustrates a timing chart provided when the brake switch 33 has failed after producing a low level signal upon the completion of the braking operation, following a high level signal in response to the braking operation. When the output from the brake switch 33 becomes the low level at the middle of the intermittent operation of the second control valve 14 provided by the output from the AND circuit 30, the output from the flip-flop 32 becomes a high level and in response to this, each of the outputs from the AND circuits 30 and 39 becomes a low level, whereby the operation of the second control valve 14 is stopped. Even if the brake switch 33 fails with its output signal remaining at the low level, and when the output from the oscillator circuit 27 becomes a high level to operate the first control valve 12, it is possible that the output from the flip-flop 32 becomes a low level and that the AND circuit 39 becomes a high level in response to the input signal to the input terminal 20, and it is also possible that the output signal from the AND circuit 30 becomes a high level in response to the output from the monostable circuit 31. This insures the operation of the second control valve 14.

Figure 6:
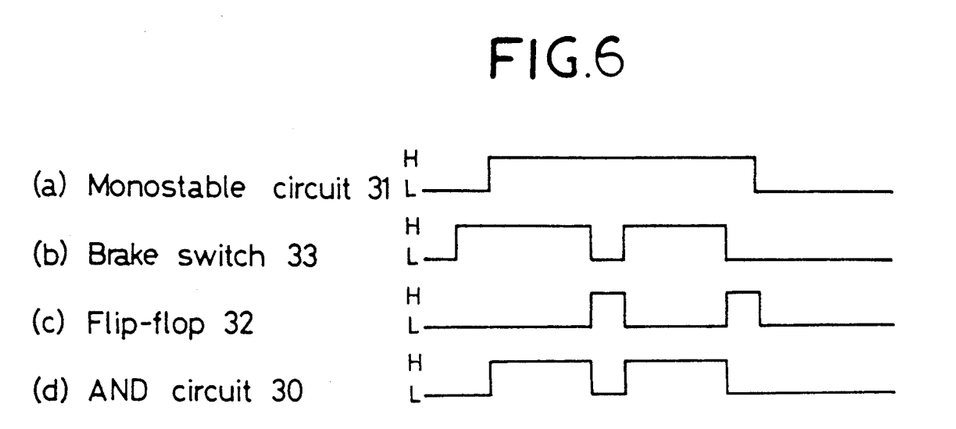

FIG. 6 illustrates a timing chart provided when the braking operation has been conducted again after being discontinued once at the middle of the intermittent operation of the second control valve 14. When the signal from the brake switch 33 becomes a low level as a result of discontinuance of the braking operation, the output from the flip-flop 32 becomes a high level in response to falling of the signal from the brake switch 33, and in resaponse to this, the outputs from the AND circuits 30 and 39 also become low levels, thereby permitting the operation of the second control valve 14 to be stopped. Then, when the braking operation is restarted, the output from the monostable circuit 35 becomes a high level as the signal from the brake switch 33 becomes a high level. This causes a resetting, so that the output from the flip-flop 32 becomes a low level and the outputs from the AND circuits 30 and 39 become high level. Accordingly, as long as the brake switch 33 is normally operative, the stopping and restarting of the operation of the second control valve 14 depending upon the braking operation can be controlled by the signal from the brake switch 33.

When the braking pressure is recovered in this manner according as the possibility of the wheel becoming locked being eliminated by the anti-lock brake control, the second control valve 14 is intermittently operated to slowly increase the braking pressure. When the braking operation is stopped in the course of such slow increasing of the pressure, the intermittent operation of the second control valve 14 is stopped. Therefore, the generation of any unnecessary operational noise is avoided, and any wasteful consumption of electric power is also avoided. Moreover, even if the brake switch 33 which detects the braking operation fails, it is possible to insure an intermittent increasing of the braking pressure by the intermittent operation of the second control valve 14 in recovery of the braking pressure after the first control valve 12 has been operated during an anti-lock brake control to reduce the braking pressure. This leads to an obviation of the need for provision of a trouble diagnostic circuit for disgnosing whether the brake switch has a trouble or not.

Although the signal $\lambda_1$ received in the input terminal 20 has been invertedly inputted to the monostable circuit 31 in the above embodiment, the OR circuit 25 may be connected to the monostable circuit 31. In this case, the given time set in the monostable circuit 31 includes a time during which the first control valve 12 is opened to reduce the braking pressure as well as a time during which the braking pressure is maintained, but these times are negligibly small as compared with the given time. It follows that the time of intermittent operation of the second control valve 14 for slowly recovering the braking pressure is substantially constant.

Figure 7:
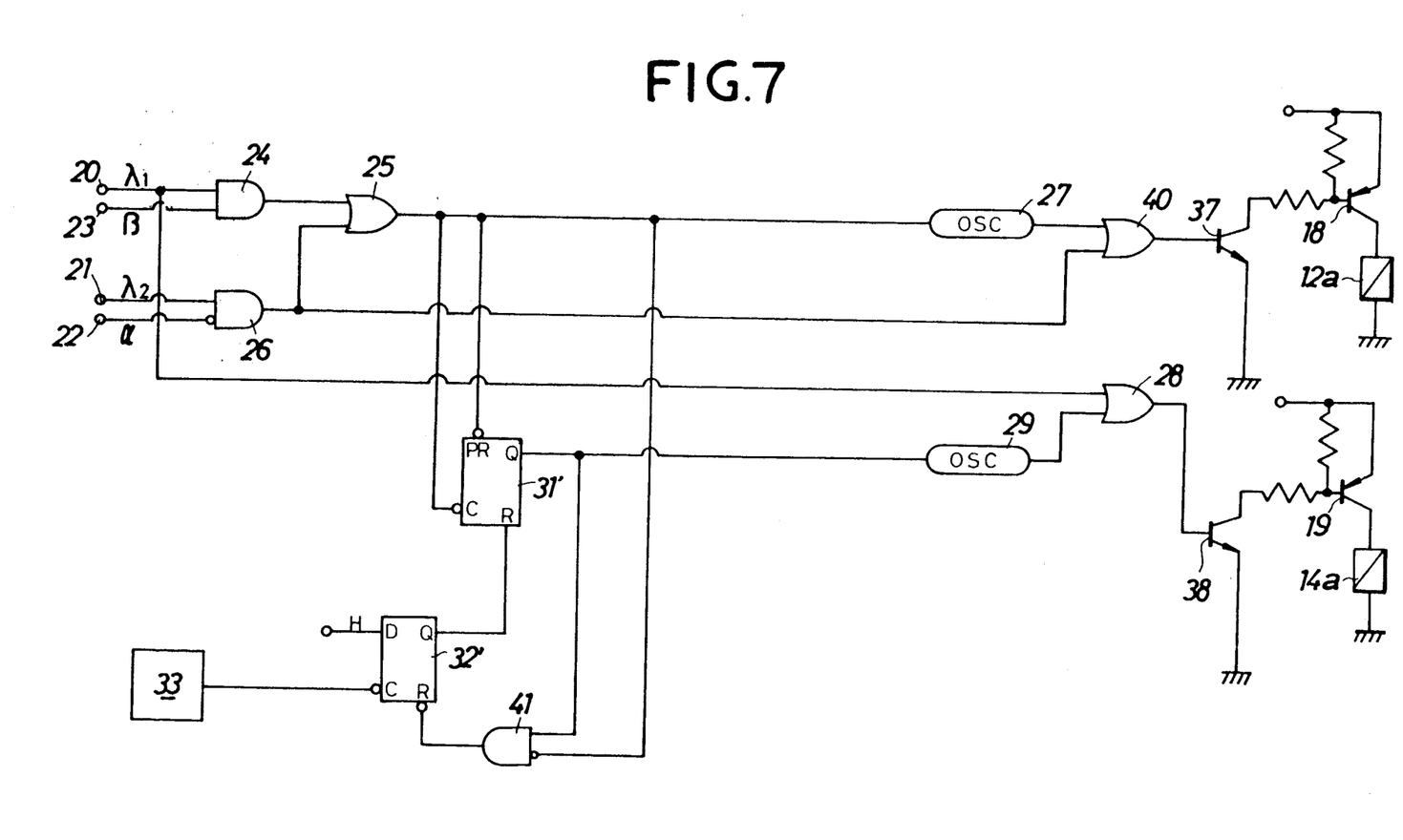
FIG. 7 is a diagram of a control circuit of another embodiment of the present invention, similar to FIG. 2.

FIG. 7 illustrates another embodiment of the present invention, wherein portions corresponding to those in the embodiment of FIGS. 1 to 6 are designated by the same reference characters.

An output terminal of an OR circuit 40 is connected to the base of the NPN transistor 37. The output terminal of the oscillator circuit 27 is connected to one of the input terminals of the OR circuit 40, and the output terminal of the AND circuit 26 is connected to the other input terminal of the OR circuit 40. This permits the OR circuit 40 to produce a signal which will intermittently become a high level when there is a possibility of the wheel becoming locked in a speed reducing condition and to produce a continuously high level signal when the possibility of the wheel becoming locked is increased when the wheel is not in a speed increasing condition. On the other hand, as in the previously described embodiment, the input terminal 20 is connected to the one input terminal of the OR circuit 28 which is connected to the base of the NPN transistor 38. Thus, when the wheel has a possibility to become locked in a speed reducing condition, the first control valve 12 (see FIG. 1) is intermittently opened, while the second control valve 14 is closed, so that the oil pressure within the control oil pressure chambers 11, 11 (see FIG. 1) is slowly increased, thereby slowly reducing the braking pressure for the brake device B. When the possibility of the wheel becoming locked is increased when not in the speed increasing condition, the first control valve 12 is closed, while the second control valve 14 remains closed, so that the oil pressure within the control oil pressure chambers 11, 11 is rapidly increased, thereby rapidly reducing the braking pressure for the brake device B.

The output terminal of the oscillator circuit 29 is connected to the other input terminal of the OR circuit 28, and an output of a monostable circuit 31' is connected to the oscillator circuit 29. As the output signal from the OR circuit 25 becomes a low level, the monostable circuit 31' produces a high level signal which is sustained for a given time from a falling of the output signal. Accordingly, the oscillator circuit 29 produces a signal which intermittently becomes a high level for a given time from the point when the output signal from the OR circuit 25 has become a high level, as a result of elimination of the locking tendency. On the other hand, the output signal from the OR circuit 28 is continuously at a high level when the input terminal 20 has the signal $\lambda_1$ received therein which becomes a high level when the signal inputted to the input terminal 20 is at a high level, i.e., the slip rate has exceeded a certain reference value. As a result, while the high level signal $\lambda_1$ is received in the input terminal 20 when the locking tendency has been eliminated, the solenoid 14a is excited to close the second control valve 14 (see FIG. 1), thereby maintaining the oil pressure within the control oil pressure chambers 11, 11 (see FIG. 1) in cooperation with the closing of the first control valve 12 (see FIG. 1). When the signal $\lambda_1$ received in the input terminal 20 has become a low level, the second control valve 14 is intermittently closed for the reaminder of the given time determined in the monostable circuit 31', thereby slowly reducing the oil pressure within the control oil pressure chambers 11, 11 to slowly increase the braking pressure for the brake device B.

Here, the time, during which the oil pressure within the control oil pressure and thus the braking pressure for the brake device B is maintained as a result of closing of the first and second control valves 12 and 14, is negligibly short as compared with the given time determined in the monostable circuit 31'. This means that the time of intermittent operation of the second control valve 14 for slowly recovering the braking pressure is substantially constant.

An output from a flip-flop 32' is received in a reset terminal R of the monostable circuit 31'. The flip-flop 32' produces a high level signal when an output signal from the brake switch 33 has become a high level upon completion of the braking operation, and an output from the AND circuit 41 is invertedly inputted to the reset terminal R.

The output signal from the monostable circuit 31' is supplied to one of input terminals of the AND circuit 41, and the output signal from the OR circuit 25 is invertedly supplied to the other input terminal of the AND circuit 41. Thus, the flip-flop 32' is reset when the output from the monostable circuit 31' has become a low level, or when the output from the monostable circuit 31' is at a high level and the output from the OR circuit 25 is at a high level.

The operation of this embodiment will be described below. When there is a possibility for the wheel to become locked in the speed reducing condition, the braking pressure for the brake device B is slowly reduced by the intermittent closing operation of the first control valve 12. On the other hand, when the locking possibility has been increased when not in the speed increasing condition, the first control valve 12 remains closed, so that the braking pressure for the brake device B is rapidly reduced. When the locking tendency is eliminated, the first control valve 12 becomes inoperative. While the signal $\lambda_1$ is at the high level, the second control valve 14 is also in a closed state, so that the braking pressure for the brake device B is maintained. Further, when the signal $\lambda_1$ becomes the low level, the second control valve 14 is intermittently closed substantially for a given time to slowly increase the braking pressure for the brake device B.

When the braking operation is discontinued in the course of intermittent operation of the second control valve 14 to slowly increase the braking pressure, the output from the oscillator circuit 29 becomes a high level in response to the output from the flip-flop 32' becoming a high level, whereby the second control valve 14 becomes inoperative, causing the intermittent pressure-increasing control to be stopped, thereby avoiding the generation of any unnecessary operational noise and a wastefull consumption of electric power.

Then, suppose that the brake switch 33 has failed. During an anti-lock brake control when the brake switch 33 has failed in an interrupted condition, and as the output from the AND circuit 25 has become a high level to open the first control valve 12, the output from the AND circuit 41 becomes a low level and is reset, attendant with the output from the flip-flop 32' becoming a low level. Therefore, it is impossible to reset the monostable circuit 31' and to stop the operation of the second control valve 14 by stopping of the braking operation, but the malfunction of the brake switch 33 cannot adversely affect the anti-lock brake control itself.

Suppose that the brake switch 33 has failed after producing the low level signal upon completion of the braking operation in the course of slowly increasing the braking pressure by the intermittent operation of the second control valve 14. In this case, the intermittent operation of the second control valve 14 is stopped upon completion of the braking operation. Even if the brake switch 33 has a trouble with its output signal remaining at the low level, and when the output from the OR circuit 25 becomes the high level to operate the first control valve 12, the output from the AND circuit 41 becomes the low level, and the flip-flop 32' is reset. Therefore, when the output from the OR circuit 25 has become the low level, the output from the monostable circuit 31' becomes the high level, and when the braking pressure is to be recovered, an intermittently high level signal is produced from the OR circuit 28. This enables an intermittent operation of the second control valve 14.

What is claimed is:

1. A method of controlling an anti-lock brake having a control valve means for controlling a braking pressure of a braking device coupled to a rotating wheel and also to a master cylinder, the method comprising the steps of:

reducing said braking pressure of said braking device for a first time period, when said rotating wheel enters a locking condition, in order to reduce the braking force of said braking device, thereby preventing the wheel from becoming locked;

intermittently increasing said braking pressure for a second predetermined time period depending upon a pressure fed from the master cylinder, when said braking pressure is to be recovered, in order to intermittently increase said braking force;

detecting a condition of a braking operation, the condition comprising one of a recovery of said braking pressure or a completion of said braking operation, said condition occurring during said second time period while said braking force is intermittently increasing;

interrupting said intermittently increasing braking force for a third time period in response to the detection of the completion of said braking operation, said third time period being less than and occurring during said second predetermined time period.

2. A method of controlling an anti-lock brake according to claim 1, wherein said step of interrupting said intermittently increasing braking pressure is cancelled when said rotating wheel is again entering a locking condition during a fourth time period.

3. A method of controlling an anti-lock brake according to claim 1 or 2, wherein said condition of the braking operation is detected by a brake switch coupled to a brake pedal.

4. A method of controlling an anti-lock brake according to claim 2, wherein the canceling of the step of interrupting the intermittently increasing braking pressure is carried out in response to a new braking operation effected after completion of said braking operation.

5. A method of controlling an anti-lock brake having a control valve means for controlling a braking pressure of a braking device coupled to a rotating wheel, the method comprising the steps of:

reducing said braking pressure of said braking device for a first time period, when said rotating wheel enters a locking condition, in order to reduce the braking force of said braking device, thereby preventing the wheel from becoming locked;

intermittently increasing said braking pressure for a second time period, when said braking pressure is to be recovered, in order to intermittently increase said braking force;

detecting a condition of a braking operation, the condition comprising one of a recovery of said braking pressure or a completion of said braking operation, said condition occurring during said second time period while said braking force is intermittently increasing;

interrupting said intermittently increasing braking force for a third time period in response to the detection of the completion of said braking operation, said third time period being less than and occurring during said second time period; and canceling said interruption of the intermittently increasing braking force when said rotating wheel is again entering a locking condition during a fourth time period.

6. A method of controlling an anti-lock brake according to claim 5, wherein the step of canceling the interruption of the intermittently increasing braking force is carried out in response to a new braking operating effected after completion of said braking operation.

* * * * *